(12) United States Patent
Hesek et al.

(10) Patent No.: US 11,247,429 B2
(45) Date of Patent: Feb. 15, 2022

(54) BONDING ASSEMBLY SYSTEM INCLUDING TIMED BLADDER SYSTEM

(71) Applicant: RAYTHEON COMPANY, Waltham, MA (US)

(72) Inventors: Neil F. Hesek, Somerville, MA (US); Mariusz Jachtorowicz, Maynard, MA (US); Lee R. Kariger, Nashua, MA (US); Kenneth T. Hachey, Manchester, MA (US); Kevin T. O'Connor, South Yarmouth, MA (US); Peter R. Desalvo, Sr., Westminster, MA (US)

(73) Assignee: RAYTHEON COMPANY, Waltham, MA (US)

( * ) Notice: Subject to any disclaimer, the term of this patent is extended or adjusted under 35 U.S.C. 154(b) by 365 days.

(21) Appl. No.: 16/408,106

(22) Filed: May 9, 2019

(65) Prior Publication Data

US 2019/0344546 A1    Nov. 14, 2019

Related U.S. Application Data

(60) Provisional application No. 62/669,480, filed on May 10, 2018.

(51) Int. Cl.
*B32B 1/02*    (2006.01)
*B29C 70/02*    (2006.01)
(Continued)

(52) U.S. Cl.
CPC .............. *B32B 1/02* (2013.01); *B29C 70/026* (2013.01); *B32B 27/08* (2013.01); *B32B 27/32* (2013.01);
(Continued)

(58) Field of Classification Search
CPC .. B32B 1/02; B32B 1/08; B29C 70/68; B29C 70/681; B29C 70/682; B29C 70/683
See application file for complete search history.

(56) References Cited

U.S. PATENT DOCUMENTS

| 3,199,598 A | 8/1965 | Loomis |
| 6,513,757 B1 | 2/2003 | Amaoka et al. |
| 2003/0070743 A1 | 4/2003 | Kesapradist et al. |

FOREIGN PATENT DOCUMENTS

| DE | 2440086 A1 | 3/1976 |
| DE | 2719320 B1 | 12/1978 |

(Continued)

OTHER PUBLICATIONS

International Search Report and Written Opinion for International Application No. PCT/US2019/031651; Application Filing Date May 10, 2019; dated Aug. 2, 2019 (20 pages).

*Primary Examiner* — Walter Aughenbaugh
(74) *Attorney, Agent, or Firm* — Cantor Colburn LLP (57) ABSTRACT

An assembly system includes a fixture configured to support a structure including at least one component to receive a malleable material, and a bladder system coupled to the fixture. The bladder system includes a hollowed frame having sidewalls that support a bladder disposed therein. The hollowed frame has an opening that exposes an outer portion of the bladder and is configured to guide the exposed outer portion externally from the hollowed frame toward a targeted area of the structure. In response to inflating the bladder, the outer portion of the bladder extends through the opening and applies a force against the at least one component so as to form a design feature element from the malleable material.

11 Claims, 9 Drawing Sheets

(51) Int. Cl.
    *B32B 27/08*     (2006.01)
    *B32B 27/32*     (2006.01)
    *C08L 23/06*     (2006.01)
    *C08L 23/16*     (2006.01)
    *C08L 27/18*     (2006.01)
    *B64C 27/473*     (2006.01)
    *F03D 1/06*     (2006.01)

(52) U.S. Cl.
    CPC ............... *C08L 23/06* (2013.01); *C08L 23/16* (2013.01); *C08L 27/18* (2013.01); *B32B 2255/26* (2013.01); *B32B 2262/0253* (2013.01); *B32B 2262/0269* (2013.01); *B32B 2262/101* (2013.01); *B32B 2262/106* (2013.01); *B32B 2603/00* (2013.01); *B64C 27/473* (2013.01); *B64C 2027/4736* (2013.01); *C08L 2207/068* (2013.01); *F03D 1/0675* (2013.01)

(56) References Cited

FOREIGN PATENT DOCUMENTS

| JP | S5684914 A | 7/1981 |
| JP | H07117128 A | 5/1995 |

BONDING ASSEMBLY SYSTEM INCLUDING TIMED BLADDER SYSTEM

CROSS-REFERENCE TO RELATED APPLICATIONS

This application claims the benefit of U.S. Provisional Application Ser. No. 62/669,480, filed May 10, 2018, which is incorporated herein by reference in its entirety.

BACKGROUND

The present disclosure relates to forming assembly bonds and, in particular, to forming bonded structures utilizing a malleable adhesive material.

Figure 1:
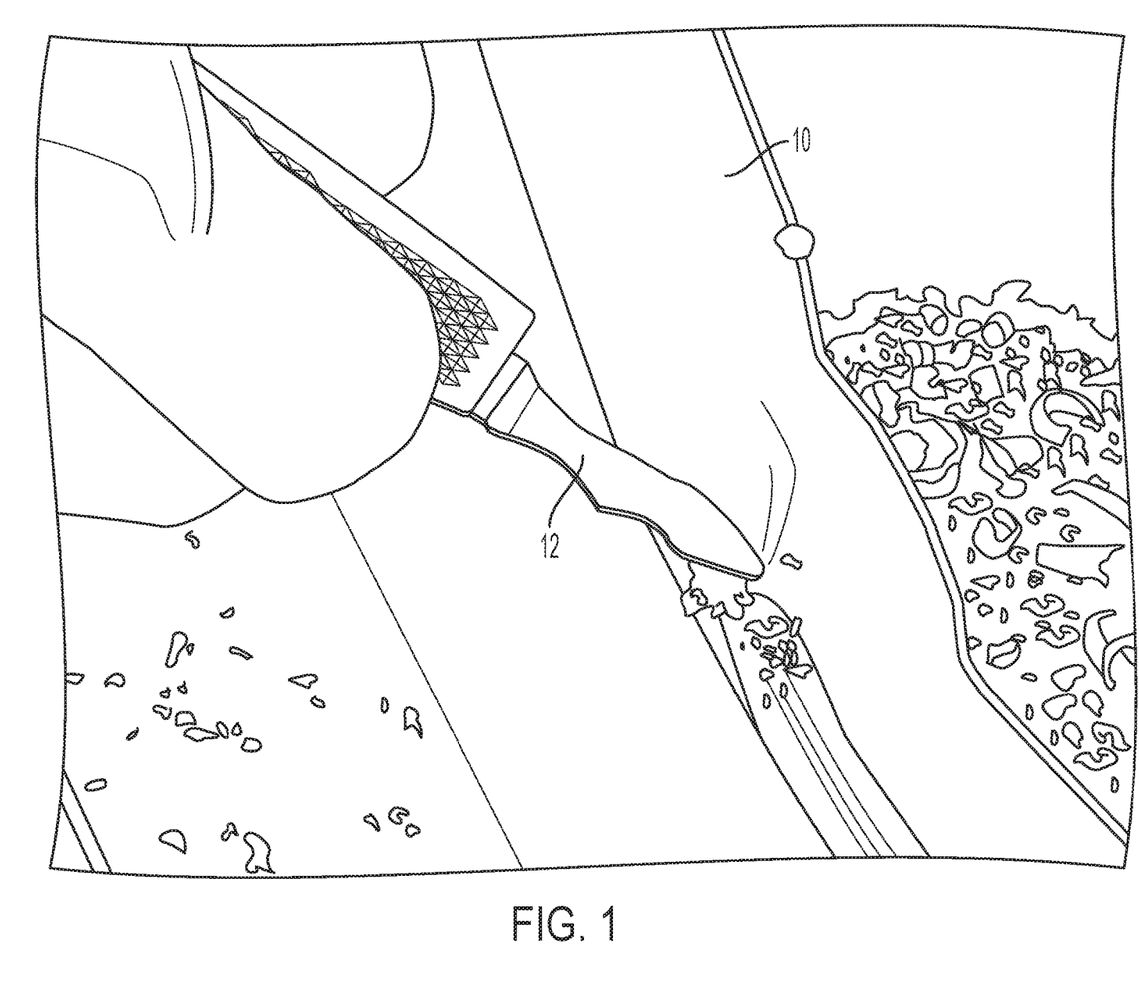
FIG. 1 shows an example of how extra adhesive can be removed.
Figure 2:
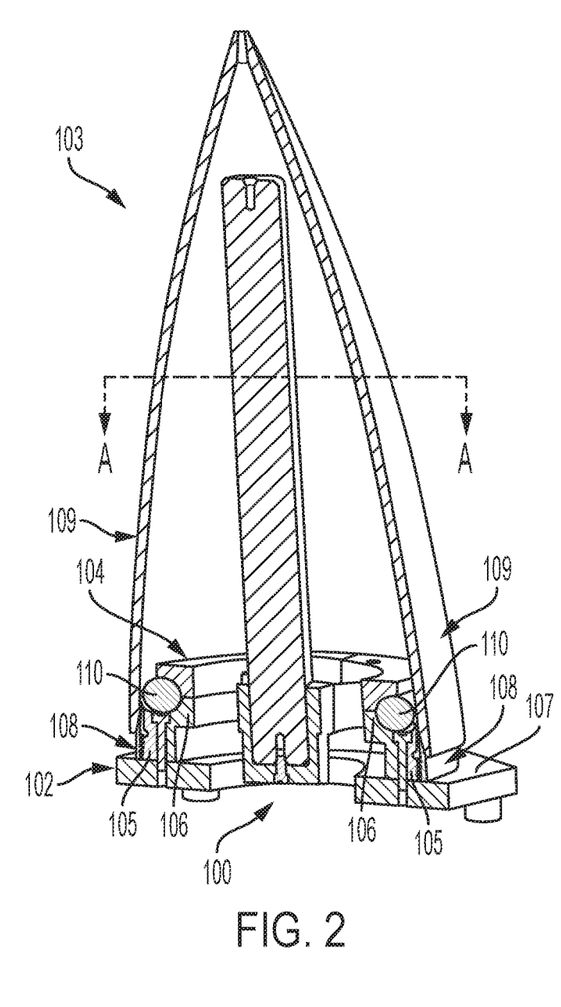
FIG. 2 is a cross-sectional illustration of a bonding assembly system according to a non-limiting embodiment.
Figure 3:
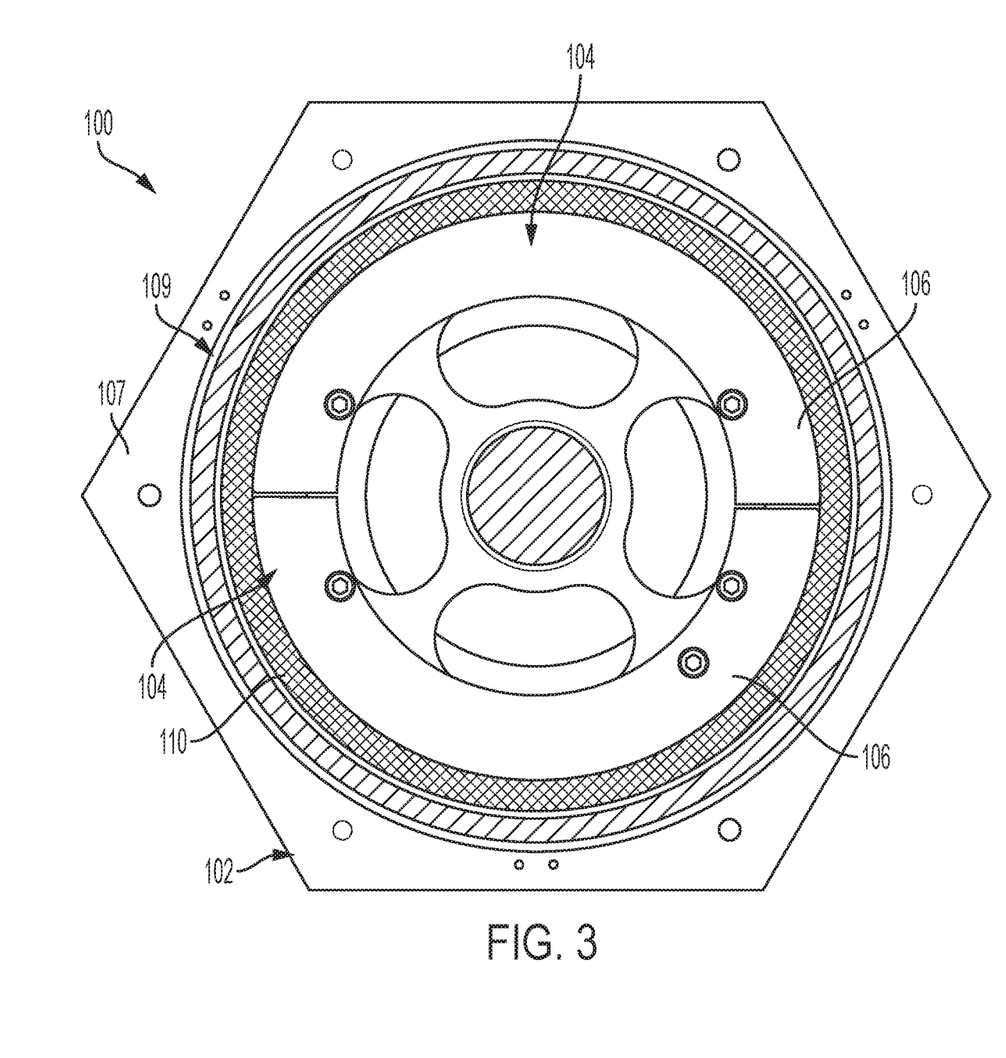
FIG. 3 shows a top view of the bonding assembly system shown in FIG. 2 taken across line A-A according to a non-limiting embodiment.
Figure 4:
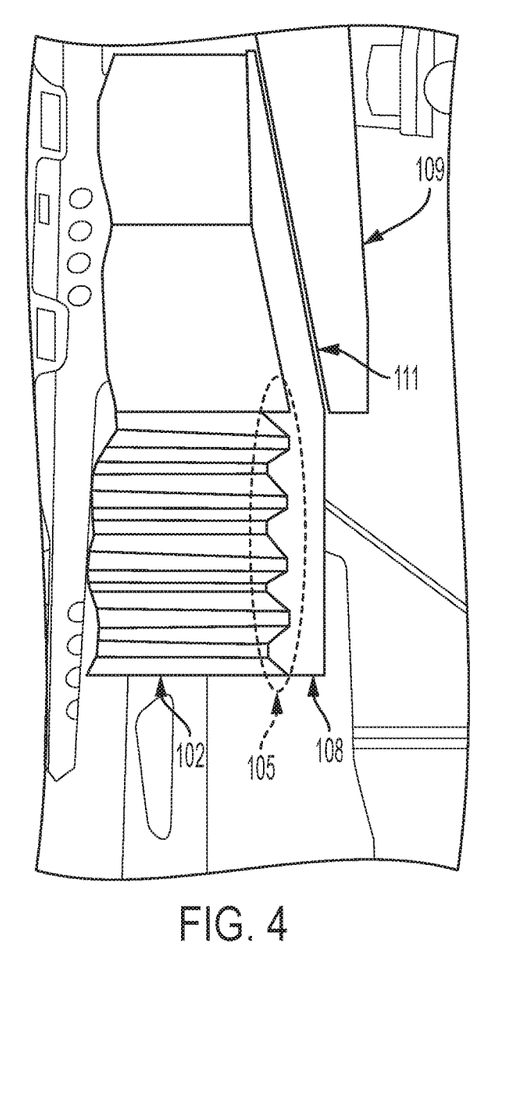
FIG. 4 is a cross-sectional view of a bonded structure assembled according to a bonding assembly system according to a non-limiting embodiment.

As a part of an assembly bond (also referred to as a bonding joint), excess adhesive flows unconstrained and blindly onto undesirable areas. The removal process is technique driven, time consuming, and an ergonomically risky operation. FIG. 1 shows an example removing adhesive 10 with a hot knife 12. The removal is followed by a secondary operation that applies a required bead fillet (not shown) in the same area as the removal, using the same adhesive as the main bond.

SUMMARY

According to a non-limiting embodiment, an assembly system includes a fixture configured to support a structure including at least one component to receive a malleable material, and a bladder system coupled to the fixture. The bladder system includes a hollowed frame having sidewalls that support a bladder disposed therein. The hollowed frame has an opening that exposes an outer portion of the bladder and is configured to guide the exposed outer portion externally from the hollowed frame toward a targeted area of the structure. In response to inflating the bladder, the outer portion of the bladder extends through the opening and applies a force against the at least one component so as to form a design feature element from the malleable material.

According to another non-limiting embodiment, a bladder system included in a bonding assembly system is provided. The bladder system comprises a hollowed frame coupled to a fixture of the bonding assembly system, and an inflatable bladder disposed in the hollowed frame. An opening is in the hollowed frame and exposes a portion of an outer surface of the bladder. The opening is configured to guide the exposed outer surface of the bladder externally from the hollowed frame toward in response to inflating the bladder.

According to yet another non-limiting embodiment, a method of forming a bonded structure comprises disposing an inflatable bladder in a hollowed frame supported by a fixture of an assembly system, and coupling at least one structure to the fixture so as to define a distance between the at least one structure and the hollowed frame. The method further comprises depositing a malleable material on the at least one structure, and inflating the bladder such that a portion of an external surface of the bladder is forced through an opening formed in the hollowed frame. The method further comprises guiding the portion of an external surface of the bladder, via the frame opening, toward a target area associated with the at least one structure; and contacting the portion of an external surface of the bladder against the target area to compress the adhesive and form a design feature element from the malleable material.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE SEVERAL VIEWS OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

The diagrams depicted herein are illustrative. There can be many variations to the diagram or the operations described therein without departing from the spirit of the invention. For instance, the actions may be performed in a differing order or actions may be added, deleted or modified.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections or positional relationships, unless otherwise specified, can be direct or indirect, and the present invention is not intended to be limited in this respect. Moreover, the various tasks and process operations described herein can be incorporated into a more comprehensive procedure or process having additional steps or functionality not described in detail herein, or one or more tasks or operations may be optional without departing from the scope of the invention.

The following definitions and abbreviations are to be used for the interpretation of the claims and the specification. As used herein, the terms "comprises," "comprising,"

"includes," "including," "has," "having," "contains," or "containing," or another variation thereof, are intended to cover a non-exclusive inclusion. For example, a composition, mixture, process, method, article, or apparatus that comprises a list of elements is not necessarily limited to only those elements but can include other elements not expressly listed or inherent to such composition, mixture, process, method, article, or apparatus.

Additionally, the terms "at least one" and "one or more" may be understood to include a number greater than or equal to one (e.g., one, two, three, four, etc.). The term "a plurality" may be understood to include a number greater than or equal to two (e.g., two, three, four, five, etc.). The terms "about," "substantially," or "approximately," or variations thereof, are intended to include a degree of error associated with measurement of the particular quantity based upon the equipment available.

Turning now to an overview of technologies that are relevant to the inventive teachings described herein, known bonding applications that are presented with addressing excess adhesive flows choose to use a film adhesive with an elevated temperature cycle cure to combat the issue of unconstrained overflow. The elevated curing temperatures, however, can cause undesirable damage to the bonded components. In other more rudimentary solutions, masking methods are used to combat adhesive overflow onto crucial areas. These masking methods, however, require additional fabrications steps and increase overall fabrication costs. In addition, some portions of the bonding interface (also referred to as a bonding joint when filled with an adhesive material) may be inaccessible by the mask, thereby still allowing for excess adhesive material that can be difficult to access and remove.

Various non-limiting embodiments described herein provide a bonding assembly system that includes a bladder system capable of both restricting and guiding the flow of excess adhesive material. In at least one non-limiting embodiment, the bladder is inflated to apply a uniform pressure on a circumferential bonding joint. In one or more embodiments, the bladder is inflated at a set time, rate, and/or pressure in order to take advantage of the viscous and malleable characteristics of the uncured adhesive or malleable material.

In one or more embodiments, the bladder is partially contained within a hollowed frame installed in the bonding assembly system. The frame includes an opening that allows a portion of the inflated bladder to extend externally therefrom and toward a targeted location. The extended inflated portion is guided by the opening so that it contacts a targeted area of one or more components to be bonded, thereby allowing the geometric outline of the inflated bladder to leave behind a required bead fillet in the correct geometric orientation. The remaining excess adhesive flow is deposited at an accessible area that allows for easy removal.

In addition, the bladder system utilizes the excess adhesive flow in order to create a structurally compliant fillet (referred to as design feature element) using the inflatable bladder's exterior geometric shape. The outer contour of the bladder and the bladder's location in the boding assembly system provides the resulting bead fillet with a concave and tapered shape which is favored for structural reasons. Normally an engineering team might look for a way to get rid of the excess adhesive entirely via masking or otherwise, rather than utilizing the excess to create a feature, thereby performing two operations simultaneously.

The inflation timing is also novel, since it can be selected based in part on the chemical composition of the adhesive. For example, the inflation of the bladder needs to occur during a specific window to take advantage of the desired viscosity of the adhesive which is prime for geometric formation before the adhesive cures. An engineering team might look for a way to have the bladder constantly inflated which would yield problems during fit checks of assembly mating.

Elsewhere, bladders are used in the industry to help aid in composites curing in autoclave operations. However, the bladder system according to various non-limiting embodiments described herein does not form any geometric features, but is used to distribute pressure and heat to help aid in curing the laminate with the geometric and dimensional features provided by the tooling.

With reference now to FIGS. 2, 3, 4, 5, 6, and 7, a bonding assembly system 100 is illustrated according to a non-limiting embodiment. The bonding assembly system 100 includes a fixture 102 and a bladder system 104. The fixture 102 is configured to support a one or more structures to be bonded to form a bonded structure 103. In the example described herein, the bonding assembly system 100 is configured to bond a mating component 108 to a target component 109 to form the bonded structure 103. Although the target component 109 is illustrated having a conical profile, the bonding assembly system 100 can perform the bonding process described herein on structures with various different types of profiles and shapes.

In at least one non-limiting embodiment, a bonding interface 111 or (also referred to as a bonding joint 111 when filled with an adhesive material) is formed between an inner wall of the target component 109 and an outer wall of the mating component 108. Accordingly, an adhesive (not shown in FIG. 4) is deposited in the bonding interface 111 so that the target component 109 can be bonded together with the mating component 108 to form the bonded structure 103. Various types of adhesives and other materials that are malleable until cured can be used without departing from the scope of the invention.

The fixture 102 includes a fixture mating mechanism 105 supported by a base 107. The fixture mating mechanism 105 is configured to interact with the mating component 108, which is intended to be bonded to the target component 109. In this manner, the mating component 108 can be coupled to the fixture 102 and stabilized. The fixture mating mechanism 105 can include, but is not limited to, a threaded sidewall, a snap-connector, or any other assembly capable of coupling the mating component 108 to the fixture 102. In the example described herein, the fixture 102 includes a threaded outer sidewall, while the mating component 108 includes a portion having a threaded inner sidewall. Accordingly, the threaded inner sidewall can be rotatably fitted with the threaded outer sidewall such that the mating component 108 is screwed together with the fixture 102. Once bonding of the bonding structure 103 is completed, the mating component 108 can be unscrewed from the outer threaded wall of the fixture 102, thereby allowing removal of the bonding structure 103 from the bonding assembly system 100.

The bladder system 104 is coupled to the base 107 of the fixture 102. The example bladder system 104 described herein has a circumferential profile to accommodate the conical profile of the intended bonded structure 103. It should be appreciated, however, that the bladder system 104 is not limited to any particular profile.

Figure 5:
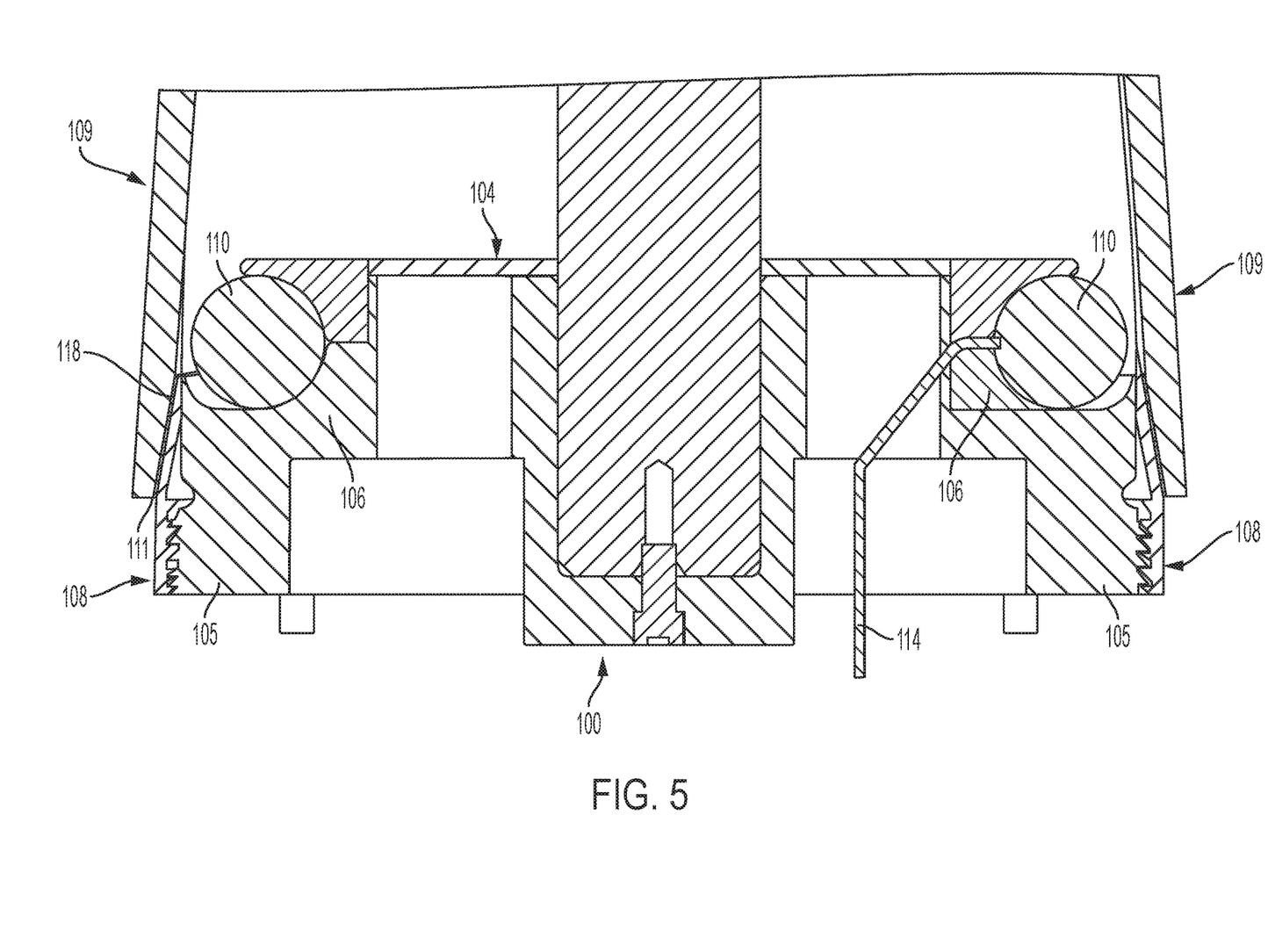
FIG. 5 shows a cross-section the bonding assembly system shown in FIGS. 2 and 3 including a bladder system installed with a deflated bladder according to a non-limiting embodiment.
Figure 6:
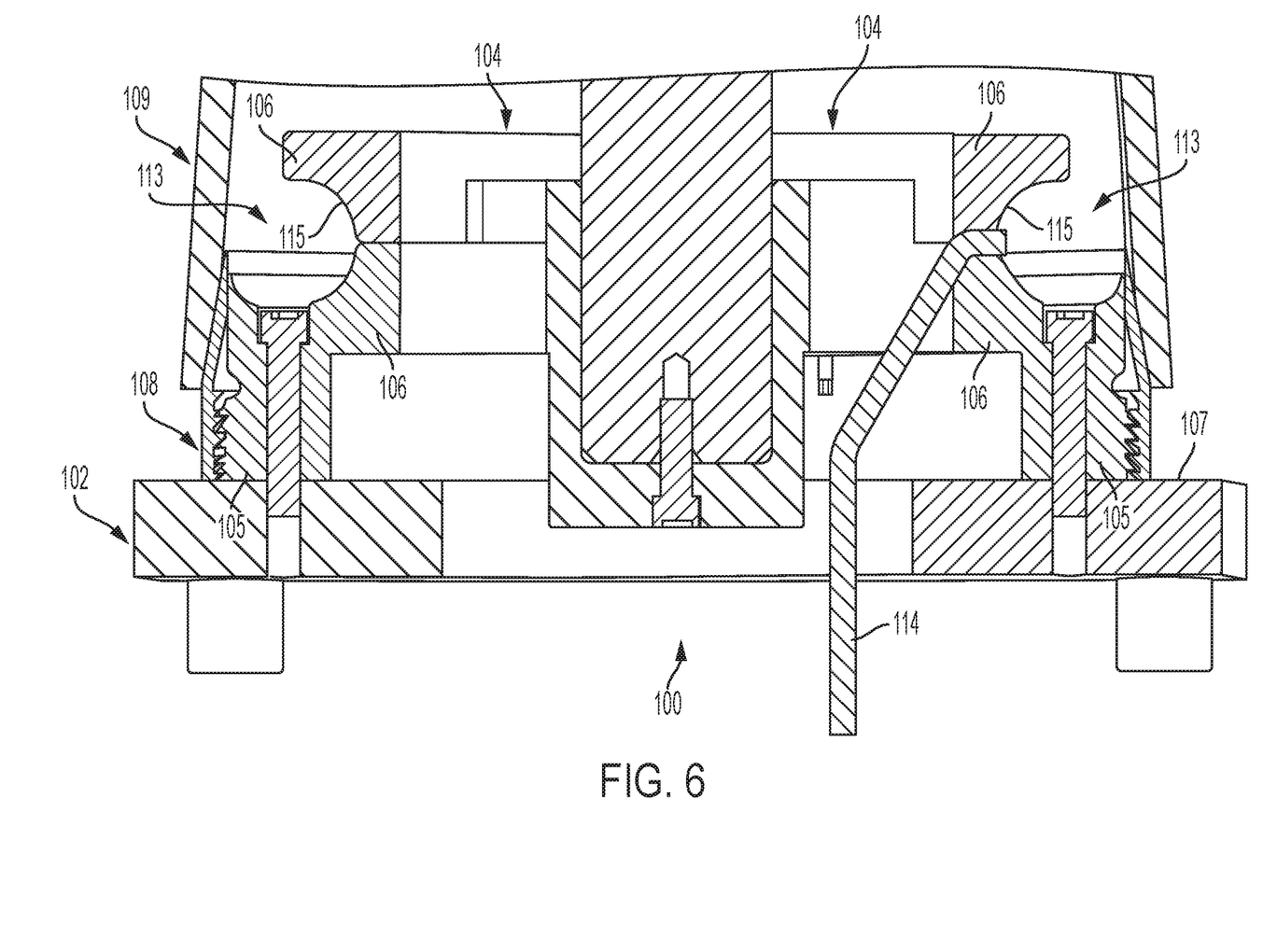
FIG. 6 shows the bladder system of FIG. 5 omitting the bladder from the bladder frame according to a non-limiting embodiment.
Figure 7:
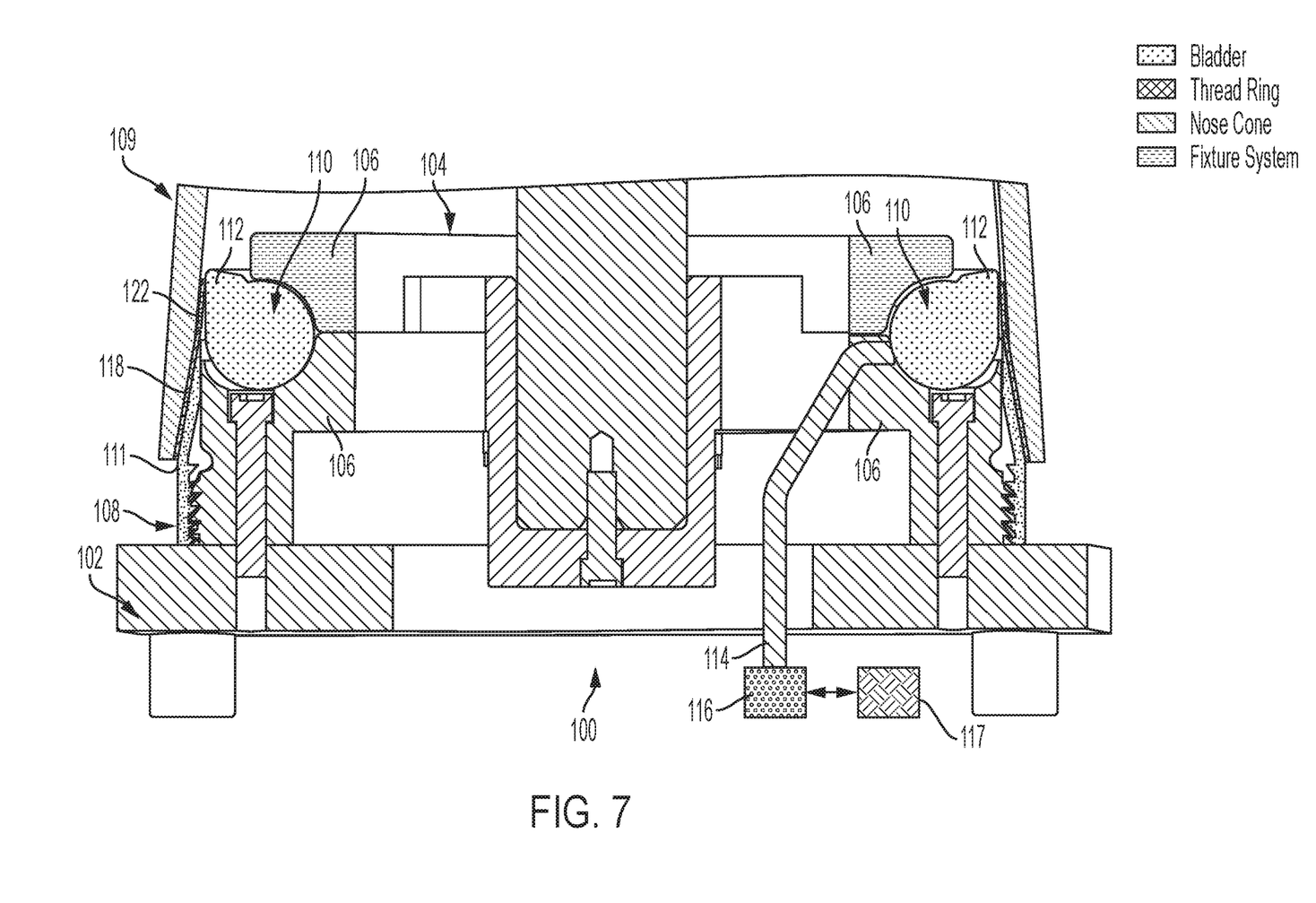
FIG. 7 illustrates the bladder system of in FIG. 6 showing the bladder inflated within the bladder frame according to a non-limiting embodiment.

The bladder system 104 includes a hollowed frame 106 that is located a distance away from the mating component 108. The hollowed frame 106 has inner walls 115 that support an inflatable bladder 110 disposed therein (see FIG.

5). The hollowed frame 106 can be formed from various rigid materials such as, for example, a polymer, plastic, or metal material. The hollowed frame 106 includes an opening 113 (see FIG. 6) that exposes an outer portion 112 of the bladder 110. In at least one non-limiting embodiment, the hollowed frame 106 extends circumferentially around a perimeter of the fixture base 107, and has a circumference that is less than the circumference of the bonded structure 103. In this manner, the component(s) of the bonded structure 103 can be slid over the frame 106 such that the frame is positioned adjacent to the inner wall of the structure 103.

The bladder 110 is formed as a sealed tube and includes a port or valve (not shown) configured to deliver air flow into the bladder 110 to facilitate inflation or to release air from the bladder 110 to facilitate deflation. In at least one non-limiting embodiment, the bladder 110 has a circumference that is less than the circumference of the frame 106. In this manner, the bladder 110 can be fitted completely within the hollowed frame 106 when deflated.

The bladder 110 can be formed from various elastomer materials such as, for example, rubber. The elasticity and/or the thickness of the elastomer material can be selected based at least in part on the amount of desired inflation. For example, a first elastomer material having a high elasticity and/or lower thickness will inflate to greater dimensions compared to a second elastomer material having a lower elasticity and/or higher thickness.

An air passage 114 extends through the fixture 102 and bladder system 104, and is in fluid communication with the port/valve. Accordingly, air flow can be directed into the bladder 110 such that the bladder 110 inflates within the frame 106. The opening 113 is configured to guide the inflated exposed outer portion 112 externally from the hollowed frame 106 toward a targeted area of the structure 103. For instance, as the bladder 110 inflates, an enclosed portion of the outer surface of the bladder 110 is forced against the inner walls 115 of frame 106. Accordingly, opposing force exerted by the inner walls 115 forces the exposed outer surface 112 through the opening 113 and out of the frame 106. In this example, the opening 113 guides the exposed outer portion 112 of the bladder toward a target area of the mating component 108 (see FIG. 7).

The opening 113 can be designed to have various different profiles based on the desired guidance and target location of the bonding application. Accordingly, the inflated outer portion 112 contacts the mating component 108 and applies a pressing force thereto. Accordingly, a uniform pressure is applied to the adhesive 118 inside of the bonding joint 111 to compress the adhesive 118. In one or more embodiments, the pressure applied by the inflated external portion 112 of the bladder 110 displaces the adhesive 118 in bonding joint 111 to form a design feature element 122.

In one or more non-limiting embodiments, the design feature element can be formed using a portion of the excess adhesive from the bond joint 111. In one example, excess adhesive 118 is controlled and guided by the inflated outer surface 112 of the bladder 110, thereby defining a geometric formation of the excess adhesive that is structurally favorable. Accordingly, the outer contour of the bladder's cross sectional design is utilized to define a shape the design feature element 122. A sacrificial piece of adhesive that can form above (in the forward axial direction) the termination of the design feature element 122 may or may not be removed according to design requirements.

Figure 8:
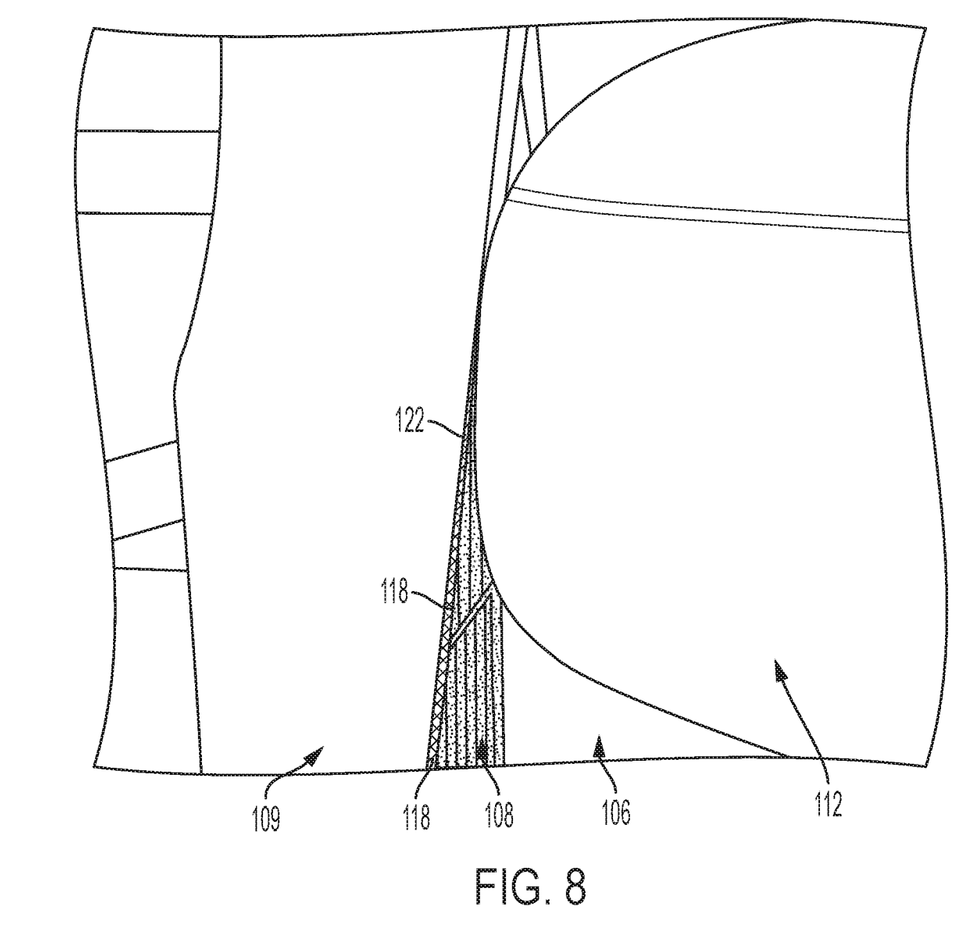
FIG. 8 is a close-up view of an inflated bladder in the process of bonding a mating structure to a target structure to form a design feature element according to a non-limiting embodiment.

The design feature element 122 can include, for example, a malleable bonding element 122 that is bonded to a target structure in response to a pressure forced applied by an inflated portion 112 of the bladder 110. In the example described herein, the design feature element 122 includes an adhesive bead fillet 122 (see FIG. 8), which can fill the bonding joint 111 extending around the entire circumference of the bonded structure 103. By applying a uniform pressure at substantially a constant location of the mating component 108 as guided by the opening 113, an improved bonding joint 111 with improved uniform dimensions can be achieved. For instance, the adhesive bead fillet 122 is formed with a uniform width (e.g., extending between the sidewall of the mating component 108 and the sidewall of the target component) around the entire circumference of the bonded structure 103.

As mentioned above, a sacrificial portion may be formed above the design feature 122 (e.g., bead fillet) and would have a profile that conforms to the profile of the inflated outer surface 112 past its tangential contact with the end of the design feature elements (e.g., the bead fillet). In other words, the sacrificial portion is forced out of the bonding joint 111 and is pushed above the design feature element 122 conformally formed against the inflated outer surface 112 of the bladder 110. When the bladder 110 is subsequently deflated, the sacrificial portion can be conveniently accessed and removed if desired.

In one or more non-limiting embodiments, the bonding assembly system 104 further includes a control system including an air supply 116 and an electronic controller 117. The air supply includes for example, an air pump configured to force air into the air passage 114, and thus into the bladder 110.

The controller 117 includes memory configured to store input parameters and a processor configured to execute algorithms and computer-readable program instructions stored in the memory is configured to control the air supply 116 so as to control the inflation and deflation of the bladder 110. In one or more embodiments the controller 117 is configured to inflate the bladder 110 according to one or more inflation parameters. The inflation parameters include, but are not limited to, an inflation time, an inflation rate, and an inflation pressure in order to take advantage of the viscous and malleable characteristics of the uncured adhesive 118. The inflation time, rate and/or pressure can be manually set according to the bonding application, parts to bonded, adhesive used, cure time of the adhesive used, etc. Once one or more of the set parameters are met, the controller 117 can automatically deactivate the air supply so as to deflate the bladder 110. For instance, the inflation parameters can include an inflation time that is set based on a time necessary for the adhesive 118 to adequately cure. Accordingly, the bladder 110 can be inflated and maintained at a set inflation pressure until the inflation time is met. In response to meeting the inflation time, the bladder 110 can be automatically deflated. Thereafter, the bonded product 103 can be removed from the fixture 102 and any excess portions above the design feature element 122 (e.g., the bead fillet) can be conveniently removed if desired.

Figure 9:
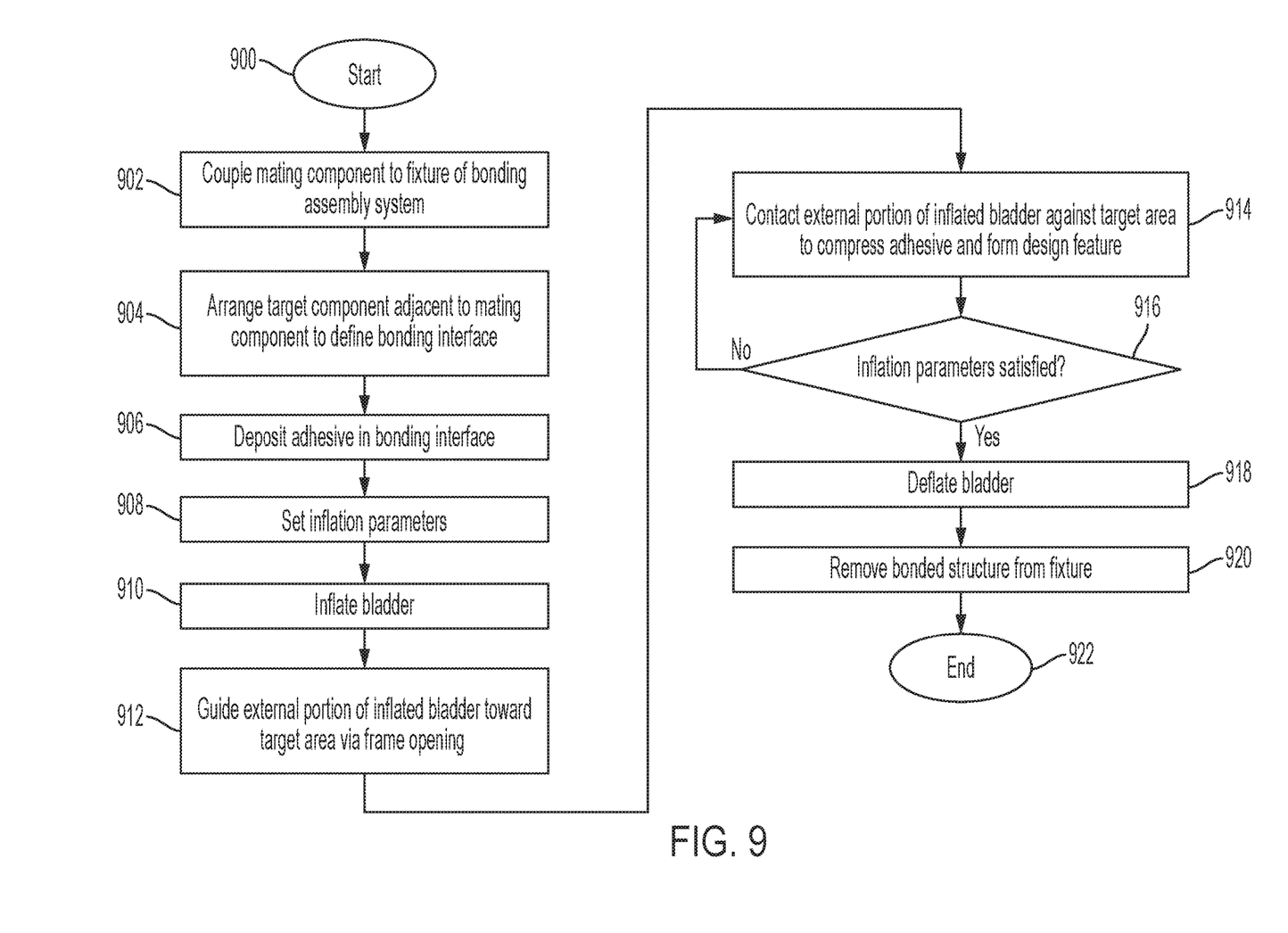
FIG. 9 is a flow diagram illustrating a method of forming a bonded structure according to a non-limiting embodiment.

Turning now to FIG. 9, a flow diagram illustrates a method of forming a bonded structure 103 according to a non-limiting embodiment. The method begins at operation 900, and at operation 902 a mating component 108 is coupled to a fixture 102 of a bonding assembly system 100. In one or more embodiments, the coupling can be achieved by interacting (e.g., screwing together) a first fixture mating mechanism (e.g., a first threading) provided on the mating component 108 with a second fixture mating mechanism (e.g., second threading) provided on the fixture 102. At operation 904, a target component 109 is arranged adjacent to the mating component 108 to define a bonding interface 111 therebetween. At operation 906, an adhesive 118 is deposited in the bonding interface to form a bonding joint 111. At operation 908, one or more inflation parameters are set. The inflation parameters can be programmed into a controller 117 configured to control an air supply 116, for example. The inflation parameters include, but are not limited to, an inflation time, an inflation rate, and an inflation pressure in order to take advantage of the viscous and malleable characteristics of the uncured adhesive 118. The inflation time, inflation rate and/or inflation pressure can be set according to the bonding application, parts to bonded, adhesive used, cure time of the adhesive used, etc.

At operation 910, the bladder 110 is inflated, and at operation 912 a portion 112 of the external surface of the bladder 110 is guided externally from the bladder frame 106 toward a target area using a frame opening 113. In at least one non-limiting embodiment, the target area includes a portion of the mating component 108 which is separated from the target component 109 by the bonding joint 111. At operation 914, the inflated external portion 112 of the bladder 110 contacts the target area to compress the adhesive 118 and form a design feature element 122. In one or more non-limiting embodiments, the design feature element 122 is a bead fillet that is formed at the termination of the bonding joint 111.

At operation 916, a determination is made as to whether the inflation parameters are satisfied. For example, when the controller 117 determines that the inflation parameters (e.g., inflation time) are not satisfied, the controller 117 maintains the air pressure within the bladder 110 so that the external portion 112 of the bladder continues pressing against the target area. When, however, the controller 117 determines that inflation parameters are satisfied, the controller 117 deflates the bladder 110 (e.g., deactivates the air supply 116) at operation 918. At operation 920, the bonded structure 103 including the formed design feature element 122 (e.g., the cured bead filet) is removed from the fixture 102, and the method ends at operation 922.

As described herein, one or more non-limiting embodiments provide a bonding assembly system that includes a bladder system capable of both restricting and guiding the flow of excess adhesive material. In at least one non-limiting embodiment, the bladder is inflated to apply a uniform pressure at the termination of a circumferential bonding joint. In one or more embodiments, the bladder is inflated at a set time, rate, and/or pressure in order to take advantage of the viscous and malleable characteristics of the uncured adhesive. Accordingly, an improved bonding joint with improved uniform dimensions can be achieved. In addition, inconsistent design features (e.g., dimensions of the bead filet) from one bonded structure to the next can be reduced.

The description of the present invention has been presented for the purpose of illustration. This description is not intended to be exhaustive or to limit the invention to the forms disclosed. Many modifications and variations will be apparent to those of ordinary skill in the art without departing from the scope and spirit of the invention. The embodiments of the invention discussed herein were chosen and described in order to best explain the principles of the invention and the practical applications, and to enable others of ordinary skill in the art to understand the invention. While certain embodiments of the invention have been described, it will be understood that those skilled in the art, both now and in the future, may make various improvements and enhancements that fall within the scope of the claims that follow.

What is claimed is:

1. An assembly system comprising:
   a fixture configured to support a structure including at least one component to receive a malleable material,
   a bladder system coupled to the fixture, the bladder system comprising a hollowed frame having sidewalls that support a bladder disposed therein; the hollowed frame including an opening that exposes an outer portion of the bladder and that is configured to guide the exposed outer portion externally from the hollowed frame toward a targeted area of the structure,
   wherein in response to inflating the bladder, the outer portion extends through the opening and applies a force against the at least one component so as to form a design feature element from the malleable material.

2. The assembly system of claim 1, wherein the fixture comprises a fixture mating mechanism configured to receive a mating structure to be bonded to a target component to assemble the structure.

3. The assembly system of claim 2, wherein the fixture mating mechanism includes a first threaded surface configured to rotatably couple together with a second threaded surface included with the mating structure.

4. The assembly system of claim 2, wherein the mating structure is disposed adjacent to the target component to define a bonding interface therebetween.

5. The assembly system of claim 4, wherein the malleable material is deposited in the bonding interface to form a bonding joint that couples together the mating component with the target component, the malleable material comprising an adhesive material.

6. The assembly system of claim 5, wherein the opening guides the inflated external portion of the bladder against the mating structure so as to force the mating structure against the target component.

7. The assembly system of claim 6, wherein a pressure applied by the inflated external portion of the bladder compresses the adhesive and forms a bead fillet having a uniform dimension.

8. The assembly system of claim 6, wherein the bladder system further comprises an air passage extending through the fixture and a bladder assembly to deliver air to the bladder.

9. The assembly system of claim 8, wherein the bladder system further comprises a control system configured to control the air to the bladder.

10. The assembly system of claim 9, wherein the control system comprises:
    an air supply in fluid communication with the air passage to deliver the air to the bladder; and
    a controller configured to control the inflation and deflation of the bladder.

11. The assembly system of claim 10, wherein the controller is configured to inflate and deflate the bladder according to at least one of a set time, rate, and pressure.

* * * * *